US012142876B2

(12) United States Patent
Shiga

(10) Patent No.: US 12,142,876 B2
(45) Date of Patent: Nov. 12, 2024

(54) CONNECTOR

(71) Applicant: TYCO ELECTRONICS JAPAN G.K., Kawasaki (JP)

(72) Inventor: Katsumi Shiga, Kawasaki (JP)

(73) Assignee: TYCO ELECTRONICS JAPAN G.K., Kawasaki (JP)

( * ) Notice: Subject to any disclaimer, the term of this patent is extended or adjusted under 35 U.S.C. 154(b) by 376 days.

(21) Appl. No.: 17/625,436

(22) PCT Filed: Jul. 8, 2020

(86) PCT No.: PCT/JP2020/026752
§ 371 (c)(1),
(2) Date: Jan. 7, 2022

(87) PCT Pub. No.: WO2021/010261
PCT Pub. Date: Jan. 21, 2021

(65) Prior Publication Data

US 2022/0263270 A1 Aug. 18, 2022

(30) Foreign Application Priority Data

Jul. 16, 2019 (JP) ................................ 2019-131207

(51) Int. Cl.
*H01R 13/627* (2006.01)
*H01R 13/502* (2006.01)
(Continued)

(52) U.S. Cl.
CPC ....... *H01R 13/6272* (2013.01); *H01R 13/502* (2013.01); *H01R 13/5202* (2013.01); *H01R 13/639* (2013.01); *H01R 13/641* (2013.01)

(58) Field of Classification Search
CPC ............. H01R 13/6272; H01R 13/502; H01R 13/5202; H01R 13/639; H01R 13/641
(Continued)

(56) References Cited

U.S. PATENT DOCUMENTS 5,160,279 A 11/1992 Sagawa et al.
8,747,146 B2 * 6/2014 Brown ................ H01R 13/639
439/489
(Continued)

FOREIGN PATENT DOCUMENTS

CN 204011989 U * 12/2014
CN 107123898 A 9/2017
(Continued)

OTHER PUBLICATIONS

International Search Report and Written Opinion for corresponding PCT/JP2020/026752 received Sep. 29, 2020 (11 pages).
(Continued)

*Primary Examiner* — Peter G Leigh

(57) ABSTRACT

A connector 10 includes a housing 20 and CPA 30 that assures the state of complete mating between the connector 10 and a mating connector. The housing 20 includes a CPA retention portion 23 that retains the CPA 30. A sliding surface 61, on which the CPA 30 slides, and side walls 62, disposed upright on both the right and left sides of the sliding surface 61, are disposed on the CPA retention portion 23. In the right and left side walls 62, through-holes 63 are opened alternately with respect to a slide direction. The connector, which includes the CPA, includes a housing having a low profile.

13 Claims, 9 Drawing Sheets

(51) Int. Cl.

| | |
|---|---|
| ***H01R 13/52*** | (2006.01) |
| ***H01R 13/639*** | (2006.01) |
| ***H01R 13/641*** | (2006.01) |

(58) Field of Classification Search

USPC .......................................................... 439/352

See application file for complete search history.

(56) References Cited

U.S. PATENT DOCUMENTS

| | | | | |
|---|---|---|---|---|
| 9,893,464 | B2 * | 2/2018 | Endo .................... | H01R 13/639 |
| 2004/0248453 | A1 | 12/2004 | McLauchlan et al. | |
| 2012/0282791 | A1 * | 11/2012 | Brown ................. | H01R 13/639<br>439/157 |
| 2014/0065857 | A1 * | 3/2014 | Guillanton ........... | H01R 13/641<br>439/131 |
| 2017/0250501 | A1 * | 8/2017 | Endo .................... | H01R 13/639 |
| 2018/0040976 | A1 | 2/2018 | Matsumoto et al. | |

FOREIGN PATENT DOCUMENTS

| | | | | |
|---|---|---|---|---|
| DE | 102017204166 | A1 * | 9/2017 | ......... H01R 13/6272 |
| EP | 2020704 | A2 * | 2/2009 | ......... H01R 13/4361 |
| JP | 4-81367 | U1 | 7/1992 | |
| JP | 11-283691 | A | 10/1999 | |
| JP | 2006505113 | A | 2/2006 | |
| JP | 2018-22664 | A | 2/2018 | |
| WO | 2019082754 | A1 | 5/2019 | |

OTHER PUBLICATIONS

Office Action for corresponding JP Application No. 2021533004 dated Nov. 1, 2022.

Extended European Search Report for corresponding EP Application No. 20840262.8-1201 dated Jun. 29, 2023 (8 pages).

Office Action for Corresponding Application No. 202080050960.2 dated Nov. 20, 2024 (16 Pages).

* cited by examiner

CONNECTOR

CROSS REFERENCE TO RELATED APPLICATIONS

This application claims priority to and is a 3.71 International Application of PCT/JP2020/026752 filed 8 Jul. 2020 (Published as WO2021010261, published 21 Jan. 2021), the subject matter of which is herein incorporated by reference in its entirety.

BACKGROUND OF THE INVENTION

The subject matter herein relates generally to electrical connectors.

Connectors are used in data communication systems. Known connectors include a connector position assurance device (CPA (connector position assurance)) that assures that the connector is in the state of being completely mated with a mating connector. An example of a connector including the CPA described is described in Japanese Patent Application JP2006-505113A. The CPA is an element that slides on a sliding surface, formed on a connector housing, in the direction of being mated with a mating connector. The CPA is enabled to slide to a specific position only in the state of complete mating with the mating connector. As a result, the complete mating with the mating connector is assured on the basis that the CPA is in the state of sliding to the specific position.

In the case of the connector carrying the CPA described above, it is necessary to form, on the housing, the sliding surface on which the CPA slides. Moreover, both sides of the sliding surface require side walls configured to guide the sliding of the CPA.

However, in the case of a waterproof connector on which a sealing element for water proof is positioned, a housing requires a portion that supports the sealing element is needed, and the housing upsized due to the portion is thus formed. For example, it is assumed that CPA is carried in such an upsized housing. Thus, it is necessary to dispose a sliding surface at a high position so that a mold that forms the sliding surface can slide while avoiding the portion causing the upsizing of the housing, and the housing may be further upsized.

A need remains for a connector having a CPA and having a low profile.

BRIEF DESCRIPTION OF THE INVENTION

In one embodiment, a connector is provided including a housing including a mating portion that is mated with a mating connector and a connector position assurance device that slides between a first position on the housing and a second position closer to the mating portion than the first position. The CPA assures that the connector is in a state of being completely mated with a mating connector on a basis that the connector position assurance device is at the second position. The housing includes a sliding surface on which the connector position assurance device slides and right and left side walls that are disposed upright on both sides, in a crosswise direction that crosses a slide direction of the connector position assurance device, of the sliding surface. The right and left side walls include through-holes that are formed alternately with respect to the slide direction.

Optionally, the sliding surface on which the CPA slides may be formed using a slide mold that moves in a transverse direction. The sliding surface may be formed using both a mold that moves to the left and a mold that moves to the right. Therefore, both the right and left side walls enable the smooth guide of the CPA while including the through-holes that are formed while forming the sliding surface.

Optionally, the connector position assurance device includes a device side catch portion that projects toward the right and left side walls at positions different from each other in left and right sides with respect to the slide direction. The right and left side walls may include a housing side catch portion that catches the device side catch portion when the connector position assurance device is at the first position, and catches the device side catch portion when the connector position assurance device is at the second position.

Optionally, the through-holes may be formed in the right and left side walls. The housing side catch portion may be formed to allow the connector position assurance device to be locked at each of a non-mating position and a complete mating position using the through-holes.

Optionally, the connector may be a water-proof type connector including a sealing element for water proof. The connector may be upsized because of including the sealing element but is not further upsized due to inclusion of the CPA.

DETAILED DESCRIPTION OF THE INVENTION

Figure 1:
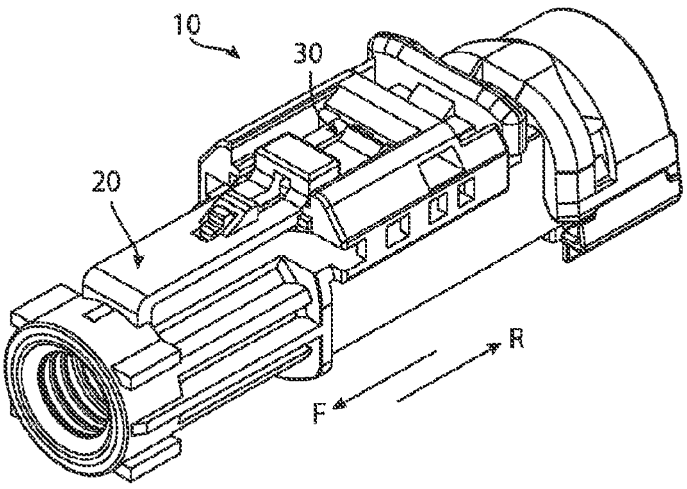
FIG. 1 is an isometric view of a connector in accordance with an exemplary embodiment.
Figure 2:
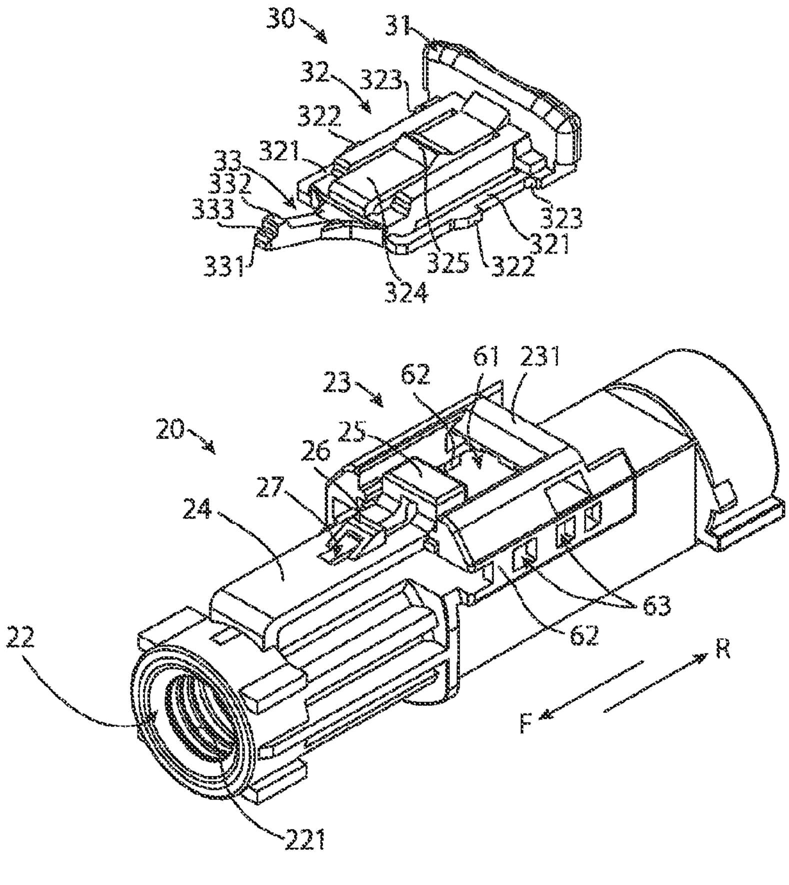
FIG. 2 is an exploded perspective view of the connector shown in FIG. 1 showing a CPA in accordance with an exemplary embodiment.
Figure 3:
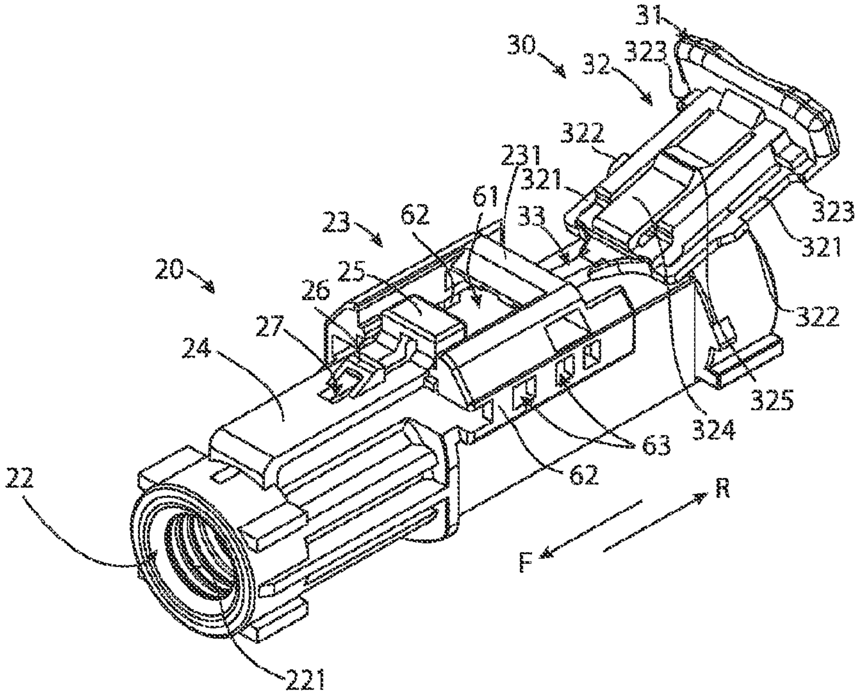
FIG. 3 is an isometric view of the connector shown in FIG. 1 in a middle stage of assembly showing the CPA partially mounted to the housing.
Figure 4A:
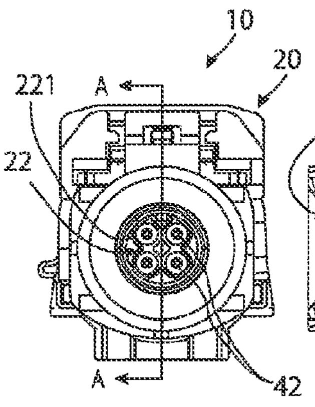
FIG. 4A is a front view of the connector in accordance with an exemplary embodiment showing the CPA in the direction of the arrow R.
Figure 4B:
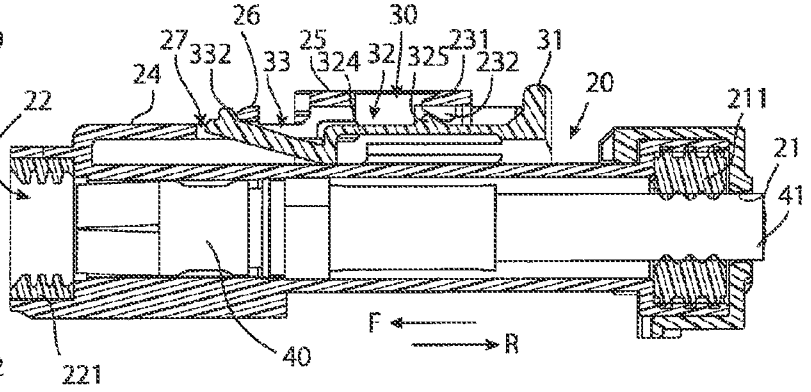
FIG. 4B is a cross sectional view of the connector taken along the arrow A-A illustrated in FIG. 4A.

FIG. 1 is an isometric view of a connector 10 in accordance with an exemplary embodiment including a housing 20 and a CPA 30 coupled to the housing 20. FIG. 2 is an exploded perspective view of the connector 10 showing the CPA 30 separated from the housing 20. FIG. 3 is an isometric view of the connector 10 in a middle stage of assembly showing the CPA 30 partially mounted to the housing 20. FIG. 4A is a front view of the connector 10 showing the CPA 30 in the direction of the arrow R. FIG. 4B is a cross sectional view taken along the arrow A-A illustrated in FIG. 4A.

The connector 10 includes: the housing 20, the CPA30, and a terminal module 40 (FIG. 4B) inserted into the housing 20. A cable 41 is connected to the terminal module 40. The cable 41 extends to be exposed from the opening 21 of the rear end of the housing 20 in the direction of the arrow R. FIG. 4B illustrates the cable 41 limited to a position at which the cable 41 is just exposed from the housing 20. The cable 41 is not illustrated in any of FIGS. 1 to 3. In an exemplary embodiment, the connector 10 includes a waterproof seal 211 disposed on just the inside of the opening 21 of the rear end of the housing 20, as illustrated in FIG. 4B. The waterproof seal 211 is wound on the cable 41 connected to the terminal module 40 and inserted into the housing 20, and waterproofs the wound portion.

The connector 10 includes a mating opening 22 into which a part of a mating connector 50 (see FIG. 7) is inserted when the connector 10 is mated with the mating connector 50. The mating opening 22 is disposed in the front end of the housing 20 in the direction indicated by the arrow F. A waterproof seal 221, which comes into contact with the portion, inserted into the mating opening 22, of the mating connector 50, and waterproofs the portion, is disposed on the inside of the mating opening 22.

The terminal module 40 in the housing 20 includes female contacts 42 (see FIG. 4A). In contrast, the mating connector 50 includes male contacts (not illustrated) that match the female contacts 42. When the connector 10 is mated with the mating connector 50, the male contacts of the mating connector 50 enter the female contacts 42 of the connector 10 to allow the contacts 42 to be electrically connected.

A CPA retention portion 23 that retains the CPA 30 is disposed in the central portion of the housing 20 in the forward-backward direction indicated by the arrows F-R.

As illustrated in FIG. 3, the CPA 30 is inserted from above in a diagonally backward direction into the CPA retention portion 23, and is retained by the CPA retention portion 23. The CPA 30 retained by the CPA retention portion 23 is placed at a non-mating position (see FIG. 5). When the connector 10 is mated with the mating connector 50, the CPA 30 slides to a complete mating position (also see FIG. 6), illustrated in FIG. 1, in the direction of the arrow F in a manner described later. The non-mating position corresponds to an example of a first position, while the complete mating position corresponds to an example of a second position.

A sliding surface 61 on which the CPA 30 is put, and side walls 62 that are disposed upright on the right and left of the sliding surface 61 and configured to guide the sliding of the CPA 30 are formed in the CPA retention portion 23. Through-holes 63 are formed in the right and left side walls 62. Moreover, a gate portion 231 that laterally extends above the sliding surface 61 so that the gate portion 231 is spaced from the sliding surface 61 is disposed in the CPA retention portion 23. A drooped portion 232 that projects downward is disposed on the gate portion 231.

A locking arm 24, of which the front end is fixed, and which extends backward to have a cantilever shape, is formed in the housing 20. A manipulation portion 25 manipulated to release mating between the connector 10 and the mating connector 50 is disposed on the free end side of the rear of the locking arm 24. In addition, a locking portion 26 is disposed at a middle position in a backward extension of the locking arm 24. A long hole 27 is opened in the locking arm 24. The long hole 27 extends from a position that is forwarder than the locking portion 26 to the free end of the rear end. The manipulation portion 25 and the locking portion 26 are formed to step over, in a crosswise direction, a portion above the long hole 27.

In an exemplary embodiment, the CPA 30 includes a manipulation portion 31, a base 32, and a beam portion 33.

The manipulation portion 31 is a portion that is manipulated by a user. By visually recognizing the position of the manipulation portion 31, the manipulation portion 31 also plays a role as an indicator that indicates whether or not the CPA 30 is at the complete mating position. On the basis that the CPA 30 is at the complete mating position, it is assured to achieve the state of complete mating between the connector 10 and the mating connector 50. FIGS. 1 and 4 illustrate the CPA 30 at the complete mating position.

The base 32 is a portion which is retained by the CPA retention portion 23 of the housing 20, and of which sliding is guided.

Beams 321 having a doubly supported beam shape, which extend in a slide direction (direction of arrow F), and of which both ends are fixed, are disposed on the right and left of the base 32. Catch projections 322 that laterally outwardly project are formed in the vicinities of the centers of the beams 321 in the slide direction. Overhang portions 323 that laterally outwardly project are formed on the rear ends of the beams 321 in the slide direction.

A beam 324 having a doubly supported beam shape, which extends in the slide direction (direction of arrow F), and of which both ends are fixed, is also disposed in the central portion of the base 32 in the crosswise direction. A projection portion 325, of which a cross section in the slide direction has a generally triangular shape, and which projects upward, is also formed in the vicinity of the center of the central beam 324 in the slide direction.

The beam portion 33 of the CPA extends from the base 32 in the forward direction indicated by the arrow F and in the diagonally upward direction to have a cantilever beam shape. A projection 332 that projects upward is formed at a position slightly closer to the base 32 than the leading end 331 of the beam portion 33. Since the projection 332 is formed at the position slightly closer to the base 32 than the leading end 331, a stepped portion 333 is formed, in the beam portion 33, between the leading end 331 of the beam portion 33 and the projection 332.

Figure 5A:
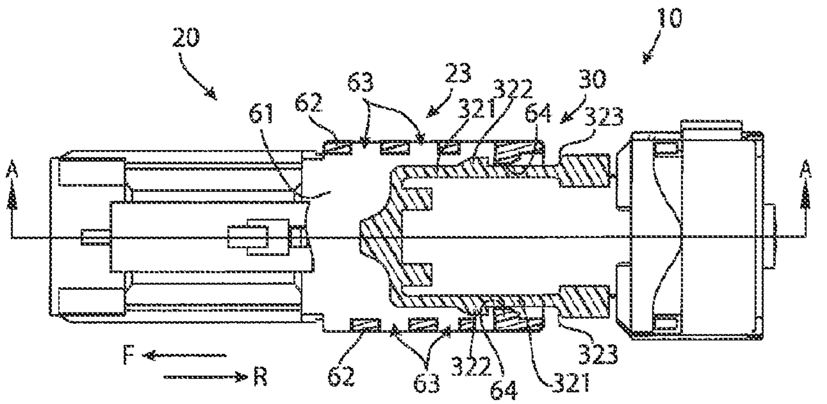
FIG. 5A is a cross sectional view of the connector in accordance with an exemplary embodiment showing the CPA at a non-mating position taken along the arrow B-B illustrated in FIG. 5B.
Figure 5B:
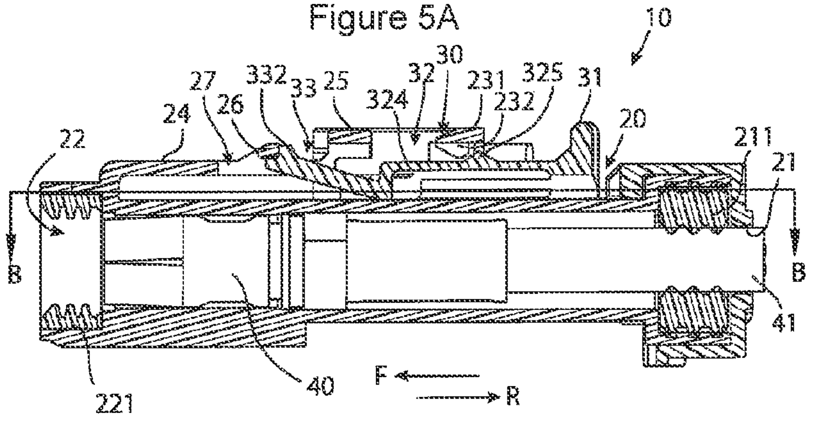
FIG. 5B is a cross sectional view of the connector in accordance with an exemplary embodiment showing the CPA at a non-mating position taken along the arrow A-A illustrated in FIG. 5A.

FIG. 5A is a cross sectional view of the connector 10 in accordance with an exemplary embodiment showing the CPA 30 at a non-mating position taken along the arrow B-B illustrated in FIG. 5B. FIG. 5B is a cross sectional view of the connector 10 in accordance with an exemplary embodiment showing the CPA 30 at a non-mating position taken along the arrow A-A illustrated in FIG. 5A. The arrow A-A illustrated in FIG. 5A indicates a cross section identical with the cross section indicated by the arrow A-A illustrated in FIG. 4A, except a difference between states in which the CPA 30 is at the non-mating position and in which the CPA 30 is at the complete mating position.

The base 32 of the CPA 30 is put on the sliding surface 61 of the CPA retention portion 23 of the housing 20. The standing walls 62 configured to guide the sliding of the CPA 30 are formed on the right and left of the sliding surface 61 of the CPA retention portion 23. The plurality of through-holes 63 formed alternately with respect to the slide direction indicated by the arrow F are formed in the right and left standing walls 62. However, the plurality of through-holes 63 are formed alternately from side to side in a portion forward in the slide direction, and the backward area includes a portion in which the through-holes 63 are formed at identical positions in the slide direction, and a portion in which the standing walls 62 are formed at identical positions in the slide direction.

The waterproof seal 211 is disposed immediately inside the opening 21 of the rear end of the housing 20. Therefore, the housing 20 has a shape in which a portion that covers the waterproof seal 211 greatly swells. The housing 20 is made of an insulating resin by molding. However, the rear end of the housing 20 greatly swells. Therefore, when the whole area of the sliding surface 61 is intended to be formed by a mold that moves backward, the greatly swollen rear end of the housing 20 obstructs the formation, and it is necessary to form the sliding surface 61 at a higher position at which the obstruction is avoided. When the sliding surface 61 is intended to be formed by a mold that moves forward, the locking arm 24 obstructs the formation. Thus, the sliding surface 61 is formed using a mold that moves in a lateral direction. However, even when such a mold that moves in a lateral direction which is any of left and right directions is adopted, the right and left standing walls 62 cannot be formed in the direction in which the mold moves. The right and left standing walls 62 are used to guide the sliding of the CPA 30. In an exemplary embodiment, the sliding surface 61 is formed while leaving the right and left standing walls 62 unchanged by alternately arranging molds that move in right and left directions, respectively. In a rear portion of the sliding surface 61 in the slide direction (direction of arrow F), however, the through-holes 63 may be formed at identical positions of both the right and left standing walls 62 in the slide direction, and the through-holes 63 are formed at the identical positions in the slide direction. Moreover, a mold that moves backward can be positioned in a more rearward portion than the portion, and the standing walls 62 are formed at identical positions in the slide direction in the portion. Catch salients 64 or flanges that laterally inwardly project are formed on the standing walls 62 formed at the identical positions in the slide direction.

When the CPA 30 is mounted in the housing 20 as illustrated in FIG. 3, the catch projections 322 formed on the beams 321 of the right and left of the base 32 of the CPA 30 are pressed by the catch salients 64 formed on the standing walls 62 and are temporarily bent in the middle of the mounting. Then, the catch projections 322 step over the catch salients 64 to result in a state in which the bending of the right and left beams 321 is released, as illustrated in FIG. 5A. A position at which the CPA 30 is in such a case is the non-mating position (an example of the first position). When the CPA 30 is at the non-mating position, a state in which the projection portion 325 formed on the beam 324 in the center of the CPA 30 catches the drooped portion 232 is achieved. In addition, when the CPA 30 is at the non-mating position, the projection 332 of the beam portion 33 of the CPA 30 abuts on the locking portion 26 of the locking arm 24 of the housing 20.

When the CPA 30 is at the non-mating position, the catch projections 322 and the catch salients 64 prevent the CPA 30 from falling out in the direction of the arrow R. Moreover, when the CPA 30 is at the non-mating position, the projection 332 of the beam portion 33 abuts on the locking portion 26 of the locking arm 24, whereby the CPA 30 is prevented from sliding in the direction of the arrow F. However, the abutment of the projection 332 on the locking portion 26 may result in inhibition of the CPA 30 from sliding in the direction of the arrow F due to the deformation of the beam portion 33 in the case of the action of strong force in the direction of the arrow F. Thus, in such a case, the prevention of the sliding of the CPA 30 in the direction of the arrow F is assisted by allowing the projection portion 325 formed on the beam 324 in the center of the CPA 30 to abut on the drooped portion 232. The abutment between the projection portion 325 and the drooped portion 232 plays a role in producing a feeling of click when the CPA 30 slides toward the complete mating position in the direction of the arrow F.

Figure 6A:
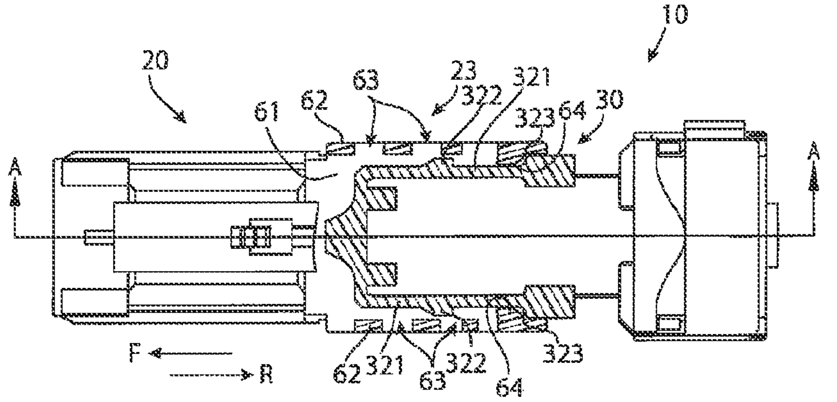
FIG. 6A is a cross sectional view of the connector in accordance with an exemplary embodiment showing the CPA at a mating position taken along the arrow B-B illustrated in FIG. 6B.
Figure 6B:
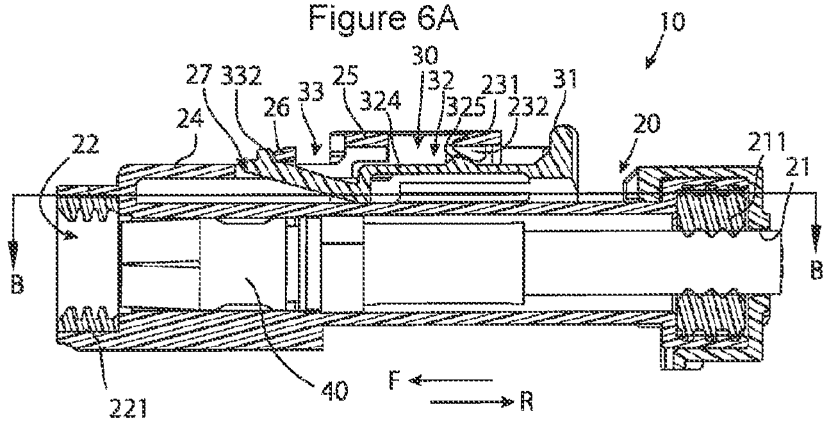
FIG. 6B is a cross sectional view of the connector in accordance with an exemplary embodiment showing the CPA at a mating position taken along the arrow A-A illustrated in FIG. 6A.

FIG. 6A is a cross sectional view of the connector 10 in accordance with an exemplary embodiment showing the CPA 30 at a mating position taken along the arrow B-B illustrated in FIG. 6B. FIG. 6B is a cross sectional view of the connector 10 in accordance with an exemplary embodiment showing the CPA 30 at a mating position taken along the arrow A-A illustrated in FIG. 6A. The arrow A-A illustrated in FIG. 6A is a cross section identical with the arrow A-A illustrated in FIG. 4A. FIG. 6B is the cross sectional view identical with FIG. 4B.

When the CPA 30 is at the complete mating position, the overhang portions 323 of the CPA 30 abut on the catch salients 64 of the standing walls 62, as illustrated in FIG. 6A. When the CPA 30 is at the complete mating position, the projection 332 of the beam portion 33 is located forwarder in the direction of the arrow F than the locking portion 26 of the locking arm 24 and abuts on the locking portion 26, as illustrated in FIG. 6B. Likewise, a state is achieved in which the projection portion 325 of the beam 324 in the center of the base 32 of the CPA 30 steps over the gate portion 231 of the CPA retention portion 23 to abut on the drooped portion 232 of the gate portion 231.

When the CPA 30 is at the complete mating state, the overhang portions 323 of the CPA 30 abut on the catch salients 64 of the standing walls 62, whereby the CPA 30 is prevented from further sliding in the direction of the arrow F.

The projection 332 abuts on the locking portion 26, and the projection portion 325 abuts on the drooped portion 232, whereby the CPA 30 is prevented from sliding from the complete mating position to the non-mating position.

The movement of each element in a case in which the CPA 30 slides from the non-mating position to the complete mating position will now be described.

Figure 7A:
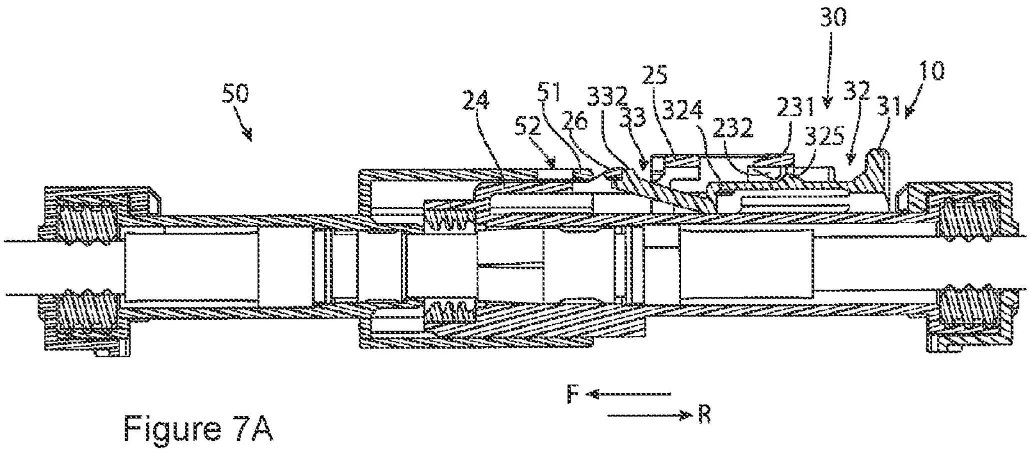
FIG. 7A is a cross sectional view of the connector in accordance with an exemplary embodiment showing the CPA at a non-mating position.
Figure 7B:
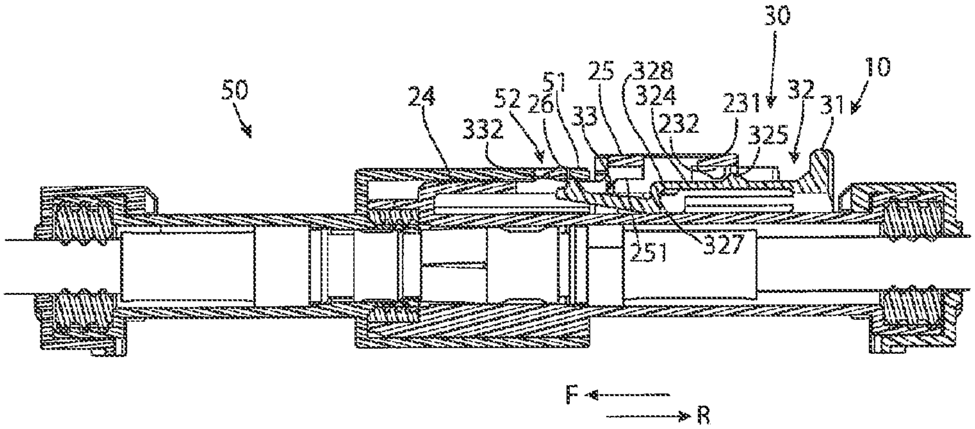
FIG. 7B is a cross sectional view of the connector in accordance with an exemplary embodiment showing the CPA at a partially-mating position.
Figure 7C:
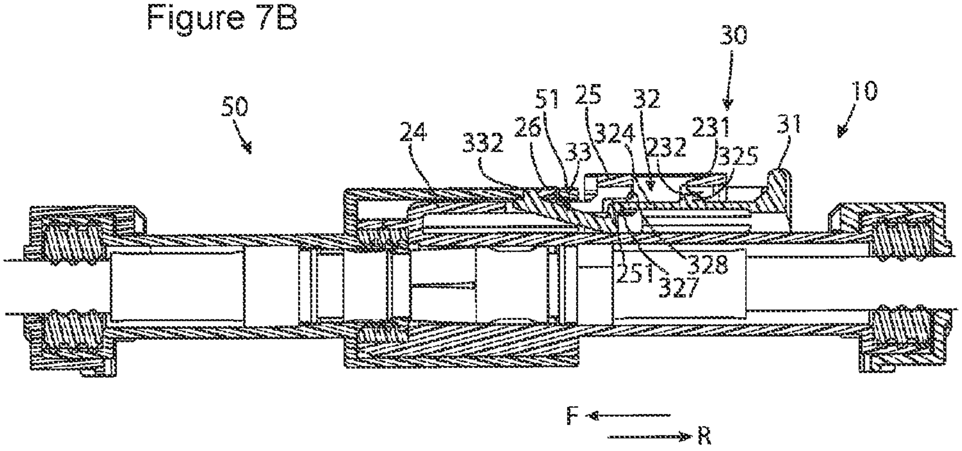
FIG. 7C is a cross sectional view of the connector in accordance with an exemplary embodiment showing the CPA at a complete mating position.

FIG. 7A is a cross sectional view of the connector 10 in accordance with an exemplary embodiment showing the CPA 30 at a non-mating position. FIG. 7B is a cross sectional view of the connector 10 in accordance with an exemplary embodiment showing the CPA 30 at a partially-mating position. FIG. 7C is a cross sectional view of the connector 10 in accordance with an exemplary embodiment showing the CPA 30 at a complete mating position. All of FIGS. 7A to 7C are cross sectional views taken along the arrow A-A illustrated in FIG. 4A. A cross section, corresponding to the arrow A-A, of the mating connector 50 is also illustrated in FIGS. 7A to 7C. FIG. 7A illustrates the CPA 30 that is at the non-mating position. FIG. 7B illustrates a state in which the connector 10 and the mating connector 50 have been mated with each other, and the CPA 30 is still at the non-mating position. FIG. 7C illustrates the CPA 30 that is at the complete mating position. These FIGS. 7A to 7C illustrate that the connector 10 moves in the direction of the arrow F with the progression of the mating while the mating connector 50 is stopped.

An abutment release portion 51 is disposed on the leading end of the mating connector 50 in the direction of the arrow R, and a locking groove 52 is formed just behind the abutment release portion 51.

When the mating is started, the abutment release portion 51 of the mating connector 50 abuts on the locking arm 24 that is disposed on the upper portion of the housing 20 of the connector 10 and extends backward, as illustrated in FIG. 7A. When the mating further proceeds, the abutment release portion 51 presses down the locking arm 24 to elastically bend the locking arm 24. Thus, the locking portion 26 of the locking arm 24 presses down the stepped portion 333 of the leading end of the beam portion 33 of the CPA 30, whereby the beam portion 33 is also elastically pressed down. In the final stage of the mating, the abutment release portion 51 passes over the locking portion 26 that has performed pressing down. When the abutment release portion 51 passes over the locking portion 26, the positions of the locking portion 26 and the abutment release portion 51 in the forward-backward direction indicated by the arrows F-R are replaced with each other, as illustrated in FIG. 7B. Although a state in which the connector 10 and the mating connector 50 are mated with each other is achieved in this stage, the CPA 30 is still at the non-mating position. As described above, the locking groove 52 is formed at a position adjacent to the abutment release portion 51 of the mating connector 50. Therefore, when the abutment release portion 51 passes over the locking portion 26, the elastic deformation of the locking arm 24 is released to allow the locking portion 26 to enter the locking groove 52. As a result, the connector 10 and the mating connector 50 are completely mated with each other, and the locking portion 26 and the locking groove 52 (abutment release portion 51) engage with each other, whereby the connector 10 and the mating connector 50 are locked in a complete mating state.

However, the abutment release portion 51 is located on the projection 332 of the beam portion 33 of the CPA 30 in the complete mating state illustrated in FIG. 7B. Therefore, the beam portion 33 remains in the state of being pressed down by the abutment release portion 51.

Then, the CPA 30 is pressed toward the forward direction indicated by the arrow F.

In the state illustrated in FIG. 7B, the beam portion 33 remains pressed down by the abutment release portion 51. In other words, the abutment of the beam portion 33 with the locking portion 26 is released.

Accordingly, in this stage, obstruction in sliding of the CPA 30 in the forward direction (direction indicated by arrow F) is the interference between the projection portion 325 of the beam 324 of the CPA 30 and the drooped portion 232 of the gate portion 231. Thus, when the manipulation portion 31 of the CPA 30 is pressed forward with strength with which the interference between the projection portion 325 and the drooped portion 232 is overcome, the CPA 30 slides to the complete mating position illustrated in FIG. 7C with a feeling of click due to the interference.

As described above, the CPA 30 can slide to the complete mating position only when the state of the complete mating between the connector 10 and the mating connector 50 is achieved. When the CPA 30 slides to the complete mating position, the projection 332 of the beam portion 33 is fit in the forwarder portion of the long hole 27 of the locking arm 24 than the locking portion 26 to allow the projection 332 to abut on the locking portion 26. When the CPA 30 slides to the complete mating position, the projection portion 325 of the beam 324 of the CPA 30 is located in front of the drooped portion 232 of the gate portion 231, and interferes with the drooped portion 232. The abutment and the interference prevent the CPA 30 from unintentionally sliding from the complete mating position.

When the CPA 30 is at the complete mating position, the lower surface 251 of the manipulation portion 25 of the locking arm 24 abuts on the upper surface 328 of the fixed end 327 of the beam 324 of the CPA 30, whereby the manipulation portion 25 of the locking arm 24 is prevented from being pressed down. In other words, the engagement between the locking portion 26 and the locking groove 52 (abutment release portion 51) is prevented from being unintentionally released, to maintain the locking of the state of the complete mating between the connector 10 and the mating connector 50, when the CPA 30 is in the state of sliding to the complete mating position.

In other words, the state of the complete mating between the connector 10 and the mating connector 50 is assured on the basis that the CPA 30 is at the complete mating position.

The mating between the connector 10 and the mating connector 50, and the sliding of the CPA 30 have been separately described. In the present embodiment, however, the mating is enabled while pressing the manipulation portion 31 of the CPA 30 after a stage prior to the complete mating. In such a case, pressing of the manipulation portion 31 of the CPA 30 allows the mating to proceed, and the CPA 30 to slide to the complete mating position just after the complete mating.

In order to separate the connector 10 and the mating connector 50 in the complete mating state, first, the manipulation portion 31 of the CPA 30 is pulled backward (direction of arrow R) to allow the CPA 30 to slide to the non-mating position. Then, the manipulation portion 25 of the locking arm 24 of the housing 20 of the connector 10 is pressed down with a finger or the like to release the locking between the locking portion 26 and the locking groove 52 (abutment release portion 51). The release of the locking enables the separation of the connector 10 and the mating connector 50.

A second embodiment will now be described. In the description of the following second embodiment, the illustration and description of points common to the first embodiment are omitted, and the illustration and description of only the characteristic portions of the second embodiment are given. In the second embodiment, elements corresponding to the elements of the first embodiment are denoted by the same reference characters as the reference characters used in the first embodiment even there are differences in shapes and the like between the first and second embodiments.

Figure 8A:
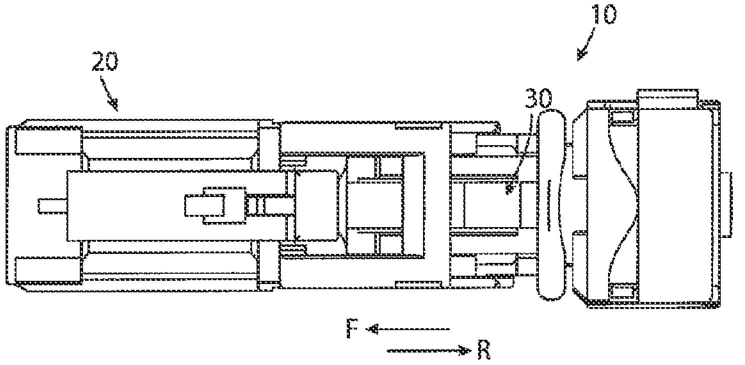
FIG. 8A is a top view of a connector in accordance with an exemplary embodiment showing the CPA at a non-mating position.
Figure 8B:
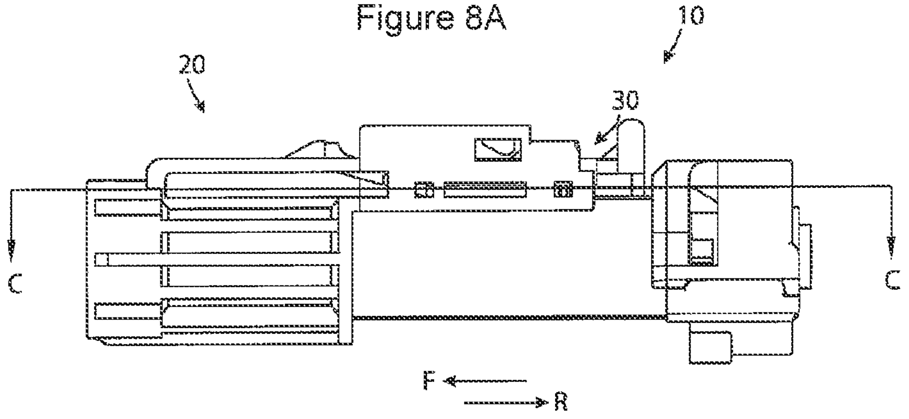
FIG. 8B is a side view of the connector shown in FIG. 8A.
Figure 8C:
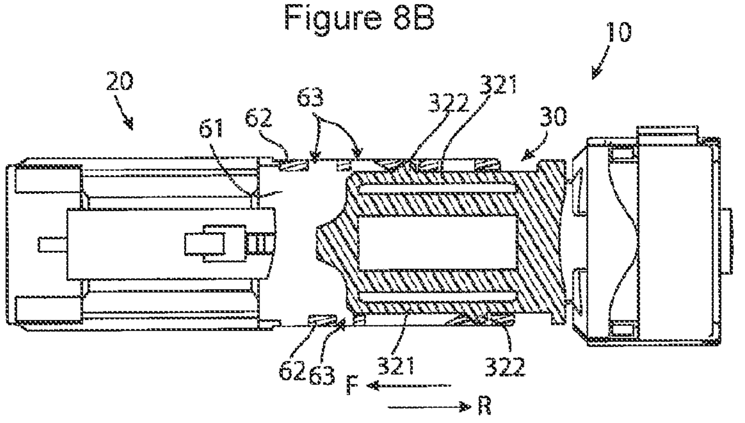
FIG. 8C is a cross sectional view of the connector shown in FIG. 8A taken along the arrow C-C illustrated in FIG. 8B.

FIG. 8A is a top view of a connector 10 in accordance with an exemplary embodiment showing the CPA 30 at a non-mating position. FIG. 8A is a side view of the connector 10 shown in FIG. 8A. FIG. 8C is a cross sectional view of the connector 10 shown in FIG. 8A taken along the arrow C-C illustrated in FIG. 8B.

Figure 9A:
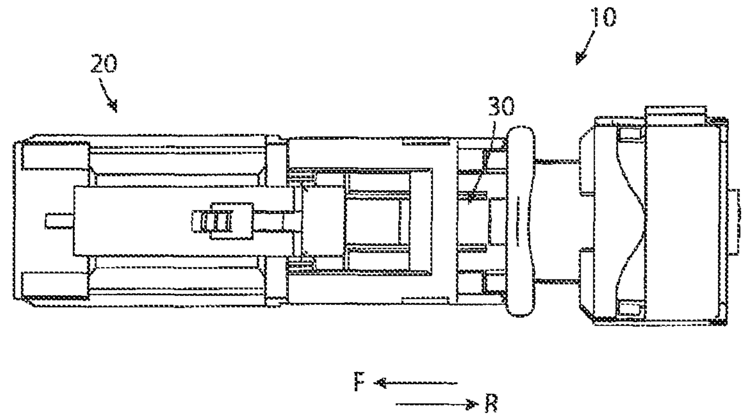
FIG. 9A is a top view of a connector in accordance with an exemplary embodiment showing the CPA at a non-mating position.
Figure 9B:
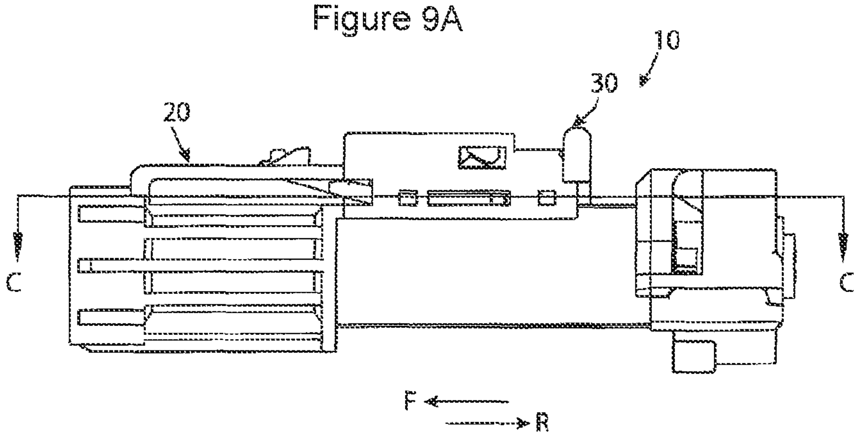
FIG. 9B is a side view of the connector shown in FIG. 9A.
Figure 9C:
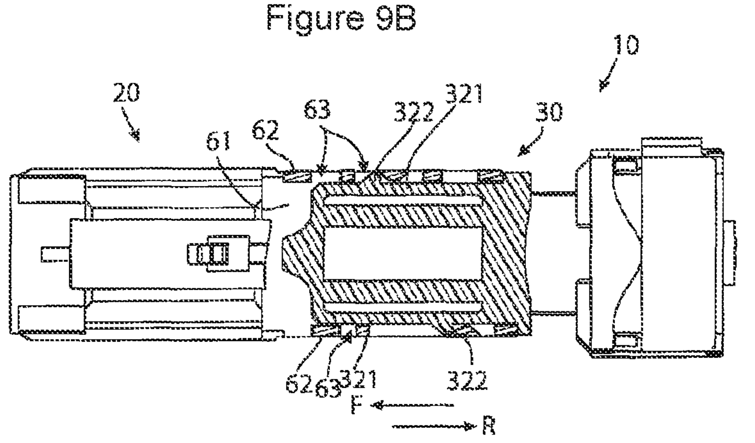
FIG. 9C is a cross sectional view of the connector shown in FIG. 9A taken along the arrow C-C illustrated in FIG. 9B.

FIG. 9A is a top view of a connector 10 in accordance with an exemplary embodiment showing the CPA 30 at a non-mating position. FIG. 9B is a side view of the connector 10 shown in FIG. 9A. FIG. 9C is a cross sectional view of the connector 10 shown in FIG. 9A taken along the arrow C-C illustrated in FIG. 9B.

In the first embodiment described above, the right and left beams 321 of the CPA 30 play a role in preventing falling out due to interference between the catch projections 322 disposed on the right and left beam 321 and the catch salients 64 disposed on the standing walls 62, as illustrated in FIG. 5A. However, a portion that prevents the CPA 30 from sliding forward (in direction of arrow F) from the non-mating position illustrated in FIG. 5A is not formed on the right and left beams 321. The CPA 30 is prevented from sliding forward from the non-mating position by the interference between the projection portion 325 of the central beam 324 and the drooped portion 232 of the gate portion 231 and by the abutment of the projection 332 of the beam portion 33 on the locking portion 26 of the locking arm 24, as illustrated in FIG. 5B.

In the second embodiment, the catch projections 322 of right and left beams 321, together with a central beam 324 and a beam portion 33, allows CPA 30 to temporarily catch a non-mating position by interference between the catch projections 322 and standing walls 62, as illustrated in FIG. 8C. The catch projections 322 of the right and left beams 321 also allow the CPA 30 to mainly catch the complete mating position by the interference between the catch projections 322 and the standing walls 62 when the CPA 30 is at a complete mating position, as illustrated in FIG. 9C.

In such a case, the right and left beams 321 allow the temporal catching at the non-mating position and the main catching at the complete mating position by utilizing formation of a plurality of through-holes 63 in the right and left standing walls 62. However, the through-holes 63 opened in the right and left standing walls 62 are formed at different positions with respect to the right and left standing walls 62 in the slide direction indicated by the arrow F. Therefore, the catch projections 322 are also disposed at different positions with respect to the right and left beams 321 in correspondence with the through-holes 63.

Herein, the sliding surface 61 of the CPA retention portion 23 of the housing 20 is formed at a lower position in order to avoid upsizing, regardless of the first or second embodiment. Therefore, the through-holes 63 are formed in the standing wall 62. In the second embodiment, the necessarily formed through-holes 63 are utilized to allow the right and left beams 321 to perform locking at the non-mating position and locking at the complete mating position.

The connector 10 includes the connector position assurance device (CPA 30) that assures that the connector 10 is in the state of being completely mated with the mating connector. The connector 10 includes the CPA 30 and the housing has a low profile height. In an exemplary embodiment, the connector 10 is a water-proof type connector carrying the CPA 30. The connector 10 is not necessarily limited to the water-proof type connector. The connector 10 can be widely applied to a connector including a housing 20 having a shape in which it is impossible to form a sliding surface only by a mold that moves in a forward-backward direction.

In an exemplary embodiment, the connector includes a housing including a mating portion that is mated with a mating connector and a connector position assurance device that slides between a first position on the housing and a second position closer to the mating portion than the first position. The CPA assures that the connector is in a state of being completely mated with a mating connector on a basis that the connector position assurance device is at the second position. The housing includes a sliding surface on which the connector position assurance device slides and right and left side walls that are disposed upright on both sides, in a crosswise direction that crosses a slide direction of the connector position assurance device, of the sliding surface. The right and left side walls include through-holes that are formed alternately with respect to the slide direction.

Optionally, the sliding surface on which the CPA slides may be formed using a slide mold that moves in a transverse direction. The sliding surface may be formed using both a mold that moves to the left and a mold that moves to the right. Therefore, both the right and left side walls enable the smooth guide of the CPA while including the through-holes that are formed while forming the sliding surface.

Optionally, the connector position assurance device includes a device side catch portion that projects toward the right and left side walls at positions different from each other in left and right sides with respect to the slide direction. The right and left side walls may include a housing side catch portion that catches the device side catch portion when the connector position assurance device is at the first position, and catches the device side catch portion when the connector position assurance device is at the second position.

Optionally, the through-holes may be formed in the right and left side walls. The housing side catch portion may be formed to allow the connector position assurance device to be locked at each of a non-mating position and a complete mating position using the through-holes.

Optionally, the connector may be a water-proof type connector including a sealing element for water proof. The connector may be upsized because of including the sealing element but is not further upsized due to inclusion of the CPA.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector comprising:

a housing including a mating portion that is mated with a mating connector; and a connector position assurance (CPA) device coupled to the housing, the CPA device slides between a first position and a second position on the housing, the second position being closer to the mating portion than the first position, the CPA device assures that the connector is in a state of being completely mated with a mating connector on a basis that the CPA device is at the second position;

wherein the housing includes a sliding surface on which the CPA device slides and right and left side walls that are disposed upright on both sides of the sliding surface in a crosswise direction that crosses a slide direction of the CPA device, wherein the right and left side walls are positioned to interface with the CPA device to position the CPA device at the first and second positions; and wherein the right and left side walls comprise through-holes that are formed alternately with respect to the slide direction.

2. The connector according to claim 1, wherein the CPA device includes a device side catch portion that projects toward the right and left side walls at positions different from each other in left and right sides with respect to the slide direction; and the right and left side walls include a housing side catch portion that catches the device side catch portion when the CPA device is at the first position, and catches the device side catch portion when the CPA device is at the second position.

3. The connector according to claim 2, further comprising a sealing element for water proof.

4. The connector according to claim 3, wherein the sealing element is axially offset from the CPA device.

5. The connector according to claim 1, wherein the CPA device includes device side catch portions that project toward the right and left side walls; and the right and left side walls include housing side catch portions that catch the device side catch portions to hold the CPA device at the first and second positions.

6. The connector according to claim 1, wherein the CPA device includes a base having device side catch portions extending from both right and left side edges of the base, the device side catch portions face outward to interface with the right and left side walls of the housing.

7. The connector according to claim 1, wherein the CPA device includes a base having doubly supported beams extending along both right and left sides of the base, the doubly supported beams including device side catch portions facing outward to interface with the right and left side walls of the housing.

8. A connector comprising:

a housing including a mating portion that is mated with a mating connector;

a connector position assurance (CPA) device coupled to the housing, the CPA device slides between a first position and a second position on the housing, the second position being closer to the mating portion than the first position, the CPA device assures that the connector is in a state of being completely mated with a mating connector on a basis that the CPA device is at the second position; and a sealing element sealing coupled to the housing for water proof;

wherein the housing includes a sliding surface on which the CPA device slides and right and left side walls that are disposed upright on both sides of the sliding surface in a crosswise direction that crosses a slide direction of the CPA device, wherein the right and left side walls are positioned to interface with the CPA device to position the CPA device at the first and second positions; and wherein the right and left side walls comprise through-holes that are formed alternately with respect to the slide direction.

9. The connector according to claim 8, wherein the CPA device includes a device side catch portion that projects toward the right and left side walls at positions different from each other in left and right sides with respect to the slide direction; and the right and left side walls include a housing side catch portion that catches the device side catch portion when the CPA device is at the first position, and catches the device side catch portion when the CPA device is at the second position.

10. The connector according to claim 8, wherein the sealing element is axially offset from the CPA device.

11. The connector according to claim 8, wherein the CPA device includes device side catch portions that project toward the right and left side walls; and the right and left side walls include housing side catch portions that catch the device side catch portions to hold the CPA device at the first and second positions.

12. The connector according to claim 8, wherein the CPA device includes a base having device side catch portions extending from both right and left side edges of the base, the device side catch portions face outward to interface with the right and left side walls of the housing.

13. The connector according to claim 8, wherein the CPA device includes a base having doubly supported beams extending along both right and left sides of the base, the doubly supported beams including device side catch portions facing outward to interface with the right and left side walls of the housing.

* * * * *